United States Patent [19]

Shiraishi et al.

[11] Patent Number: 4,991,207

[45] Date of Patent: Feb. 5, 1991

[54] ONE-WAY ADDRESS TRANSMISSION SYSTEM OF PCM MUSIC

[75] Inventors: Kenichi Shiraishi, Yokohama; Hirokazu Kobayashi, Urawa, both of Japan

[73] Assignee: Kabushiki Kaisha Kenwood, Tokyo, Japan

[21] Appl. No.: 326,810

[22] Filed: Mar. 21, 1989

[30] Foreign Application Priority Data

Mar. 26, 1988 [JP] Japan .................................. 63-70876

[51] Int. Cl.[5] .......................... H04B 3/00; H04K 1/02; H04L 9/20

[52] U.S. Cl. .......................................... 380/9; 380/46; 380/49; 381/77; 381/81; 370/50; 370/73; 370/100.1

[58] Field of Search ..................... 380/7, 9, 13, 17, 19, 380/20, 46, 49; 455/2, 4; 381/77, 80, 81; 375/82; 370/50, 60, 73, 100.1

[56] References Cited

U.S. PATENT DOCUMENTS 4,245,245 1/1981 Matsumoto et al. .................... 380/7
4,884,267 11/1989 Miyamoto et al. .............. 370/100.1
4,922,483 5/1990 Kobayashi ........................... 370/50
4,949,394 8/1990 Shiraishi et al. ........................ 455/2

FOREIGN PATENT DOCUMENTS 0057136 3/1986 Japan .

*Primary Examiner*—Stephen C. Buczinski
*Assistant Examiner*—Bernarr Earl Gregory
*Attorney, Agent, or Firm*—Sixbey, Friedman, Leedom & Ferguson, Jr.

[57] ABSTRACT

In one way address transmission system of a PCM music broadcasting, a plurality of the PCM signals are time divisionally multiplexed and then the multiplexed data is scrambled for transmission. An address code in the transmitted scrambled data is arranged so that only the contracted receiver can descramble the address code.

3 Claims, 3 Drawing Sheets

ONE-WAY ADDRESS TRANSMISSION SYSTEM OF PCM MUSIC

BACKGROUND OF THE INVENTION

1. Field of the Invention

The present invention relates to a one way address transmission system of a toll PCM music broadcasting.

2. Prior Art

In the conventional one way address transmission system of the PCM music broadcasting. There has been proposed a one way address transmission system of the PCM music broadcasting in which an address of a receiver and information indicative of the presence or absence of the contact are transmitted.

However, in the foregoing conventional one way address transmission system of the toll PCM music broadcasting, since the address of the receiver and the information indicative of the presence or absence of the contract are transmitted as a pair, an amount of information to perform the one way address control increases. Thus, there is a drawback such that it takes a time for each receiver to identify the content of the contract information.

Further, in the case where several PCM music broadcasting stations execute the broadcastings by using the same transmission system equipment, there is a drawback such that in addition to the reception of the contracted broadcasting, the broadcasting of the uncontracted broadcasting station can be also received by the same receiver.

The present invention is made in consideration of the foregoing points and it is an object of the invention to provide a one way address transmission system of a PCM music broadcasting which can eliminate the conventional drawbacks.

SUMMARY OF THE INVENTION

According to the present invention, in a one way address transmission system of a PCM music broadcasting in which after a plurality of voice signals were pulse code modulated and time divisionally multiplexed, the multiplexed data is scrambled and transmitted, a transmission side transmits individual address information so as to enable only a contracted receiver to receive and sends identifying means for identifying the information in a manner such that only the contracted receiver descrambles and can receive.

Further, the transmission side sends an identification code of a broadcasting station in a manner such that the broadcasting of the uncontracted broadcasting station cannot be received by the same receiver.

In the one way address transmission system according to the invention, the transmission side transmits the individual address information so as to enable only the contracted receiver to receive and also sends identifying means for identifying the information, so that an amount of information to execute the one way address control can be reduced. Therefore, each receiver can identify the content of the contract information in a short time.

Further, since the broadcasting station sends its own identification code, the broadcasting of the uncontracted broadcasting station cannot be received by the same receiver.

BRIEF DESCRIPTION OF THE DRAWINGS

FIG. 1 is a diagram showing a low order frame arrangement before the time division multiplexing process is executed. FIG. 2 is a diagram showing a high order frame arrangement after the time division multiplexing process was executed. FIG. 3 is a diagram schematically showing a state in which a high order frame signal is transmitted from a broadcasting station. FIG. 4 is a block diagram of the main section in a one way address system transmitter. FIG. 5 is a block diagram of the main section in a one way address system receiver.

DESCRIPTION OF THE EMBODIMENT

An embodiment of a one way address transmission system of a PCM music broadcasting according to the present invention will be described on the basis of FIGS. 1 to 5.

Figure 1:
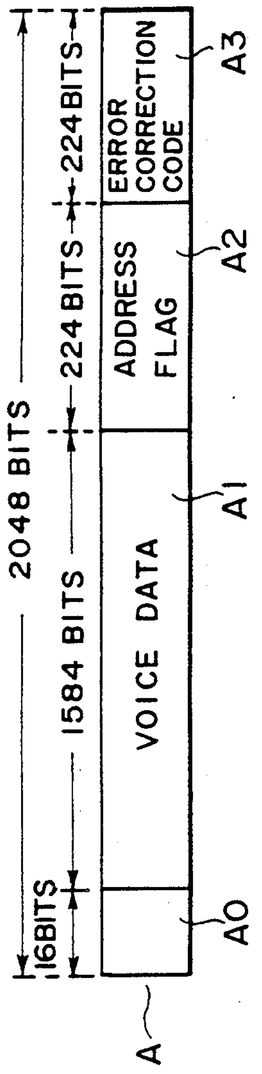
FIGS. 1 to 5 show an embodiment of a one way address transmission system of a PCM music broadcasting according to the present invention.

FIG. 1 is a diagram showing a low order frame arrangement before a time division multiplexing process is executed.

In the diagram, a low order frame A is constructed by total 2048 bits comprising: voice data $A_1$ of 1584 bits which is obtained by pulse code modulating a voice signal; an address flag $A_2$ which consists of 224 bits and is information indicative of the presence or absence of the contract of each receiver; an error correction code $A_3$ consisting of 224 bits to add the error correcting function to the voice data $A_1$ and address flag $A_2$; and a blank portion $A_0$ which is provided in the head of the low order frame A and consist of 16 bits in which no information is particularly included.

The low order frame A is constructed as a fundamental unit when time divisionally multiplexing in the one way address system.

A bit stream consisting of 224 bits such as "10010110 . . . " is written in the address flag $A_2$. The position of the bit stream indicates an address of a receiver. In the embodiment, bit "1" indicates the state in which the contract has been made and bit "0" represents the state in which the contract is not made. Therefore, in the embodiment, the receivers whose addresses are 1, 4, 6 and 7 are the contracted receivers. The receives whose addresses are 2, 3, 5 and 8 are the uncontracted receivers.

As mentioned above, in the one way address transmission system of the PCM music broadcasting, the PCM voice data $A_1$ and the individual address information indicative of the presence or absence of the contract of each receiver, that is, the address flag $A_2$ correspond in a one-to-one corresponding relation.

Figure 2:
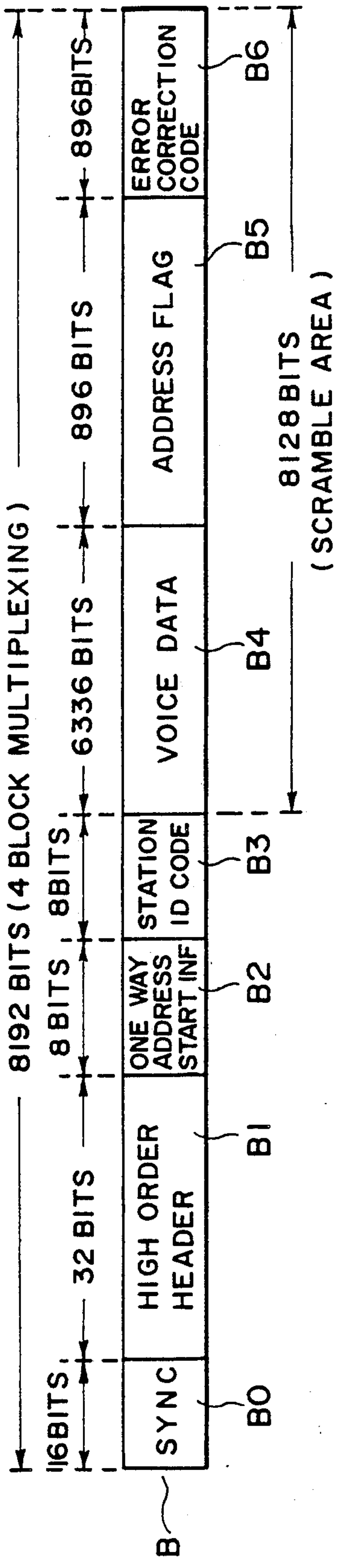

On the other hand, in the one way address transmission system, since four different broadcastings can be transmitted in a lump, four low order frame signals shown in FIG. 1, that is, the signals of four blocks are transmitted in a lump. FIG. 2 is a diagram showing a high order frame arrangement after the signals of four blocks were time divisionally multiplexed.

In FIG. 2, a high order frame B is constructed by total 8192 bits comprising: a frame sync pattern (SYNC) $B_0$ of 16 bits indicative of the head of the high order frame B; a high order header $B_1$ consisting of 32 bits obtained by encoding the content of utilization of the PCM audio after completion of the time division multiplexing process, for instance, the sampling frequency and the number of digitization bits; a ONE WAY ADDRESS START INF section $B_2$ consisting of eight bits as a start control signal upon transmission of an address flag; a STATION ID CODE section $B_3$ consisting of eight bits as an identification (ID) code of a broadcasting station; voice data $B_4$ consisting of total 6336 bits obtained by combining four voice data $A_1$ each consisting of 1584 bits of the low order frame A for four blocks; an address flag $B_5$ consisting of 896 bits obtained by encoding the individual address information indicative of the presence or absence of the contract corresponding to the voice data $B_4$ of four blocks; and an error correction code $B_6$ consisting of total 896 bits obtained by encoding the error correction codes of four blocks.

In the high order frame B, the frame sync pattern $B_0$, high order header $B_1$, ONE WAY ADDRESS START INF section $B_2$, and STATION ID CODE section $B_3$ are not scrambled. However, the voice data $B_4$, address flag $B_5$, and error correction code $B_6$ are scrambled by a PN (pseudo random) signal to provide the security.

Figure 3:
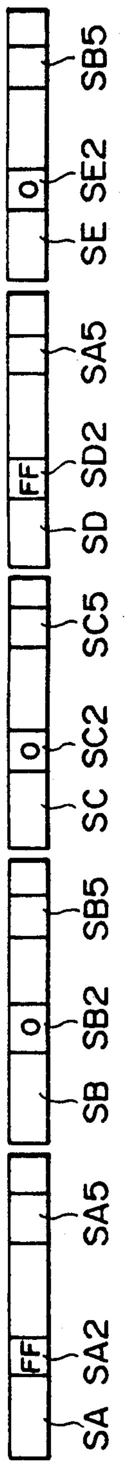

FIG. 3 is a diagram schematically showing a state in which the high order frame signals are sequentially transmitted from the broadcasting station.

The diagram shows a state in which an address flag $SA_5$ as information indicative of the presence or absence of the contract of the receivers whose addresses are 1 to 244 is sent by a high order frame signal SA, an address flag $SB_5$ as information indicative of the presence or absence of the contract of the receivers whose addresses are 245 to 488 is sent by a next high order frame signal SB, an address flag $SC_5$ as information indicative of the presence or absence of the contract of the receivers whose addresses are 489 to 732 is sent by a subsequent high order frame signal Sc, and the transmission of an address flag $SA_5$ as information indicative of the presence or absence of the contract of the receivers whose addresses are 1 to 244 is again repeated by a high order frame signal SD.

Since the address flags are sequentially sent at a predetermined period as mentioned above, in order to identify the beginning of the repetition, the ONE WAY ADDRESS START INF section B2 is provided as identifying means. Each bit of the ONE WAY ADDRESS START INF section $SA_2$ and $SD_2$ of the high order frame signals SA and SD to transmit the address flag $SA_5$ as the information indicative of the presence or absence of the contract of the receivers whose addresses are 1 to 244 as the beginning of the repetitive period is set to "1" (indicated by FF in FIG. 3) in the embodiment, thereby distinguishing from the other high order frame signals SB, SC and SE.

A construction of a transmitter of the one way address system to transmit the high order frame signals mentioned above will now be described on the basis of FIG. 4.

Figure 4:
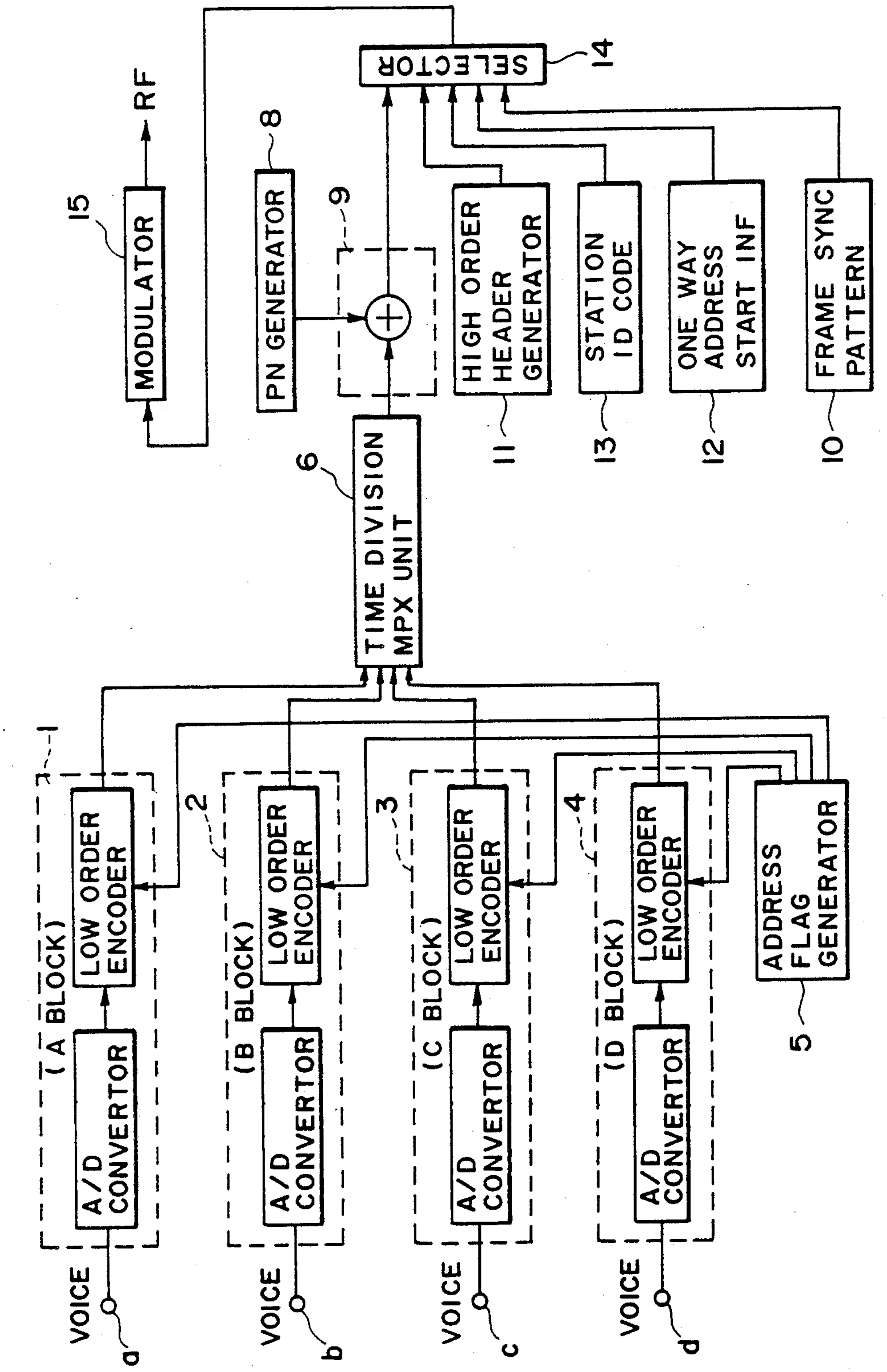

In FIG. 4, a, b, c and d denote input terminals to input different voice signals; 1, 2, 3 and 4 indicate encoders comprising A/D converters and low order encoders for sampling, digitizing, and encoding the voice signals which were respectively input from the input terminals a, b, c and d, thereby formatting so as to obtain the low order frame arrangement as shown in FIG. 1; 5 an address flag generator for encoding the individual address information as the information indicative of the presence or absence of the contract of the receivers corresponding to the voice signals which are input to the encoders 1 to 4 into the address flags $A_3$; 6 a time division multiplexer unit for multiplexing the low order frame signals as the output signals of the encoders 1 to 4 into the high order frame signal shown in FIG. 2; 8 a PN generator to generate a pseudo random signal to execute the scrambling operation for encoding; 9 a scramble unit to scramble total 8128 bits comprising the voice data $B_4$, address flag $B_5$, and error correction code $B_6$ in the high order frame signal as the output of the time division multiplexer unit 6; 10 a frame sync pattern generator to generate the frame sync pattern $B_0$; 11 a high order header generator to generate the high order header $B_1$; 12 a ONE WAY ADDRESS START INF generator to generate the ONE WAY ADDRESS START INF section $B_2$; 13 a STATION ID CODE generator to generate the STATION ID CODE section $B_3$; 14 a selector to sequentially transmit to a modulator the output signal of the scramble unit 9 and the output signals of the frame sync pattern generator 10, high order header generator 11, ONE WAY ADDRESS START INF generator 12, and STATION ID CODE generator 13; and 15 a modulator to modulate (for instance, four-phase DPSK modulation) the carrier by the signal obtained by time divisionally multiplexing an output of the selector 14. An RF (high frequency) signal as an output of the modulator 15 is output onto a CATV line.

Figure 5:
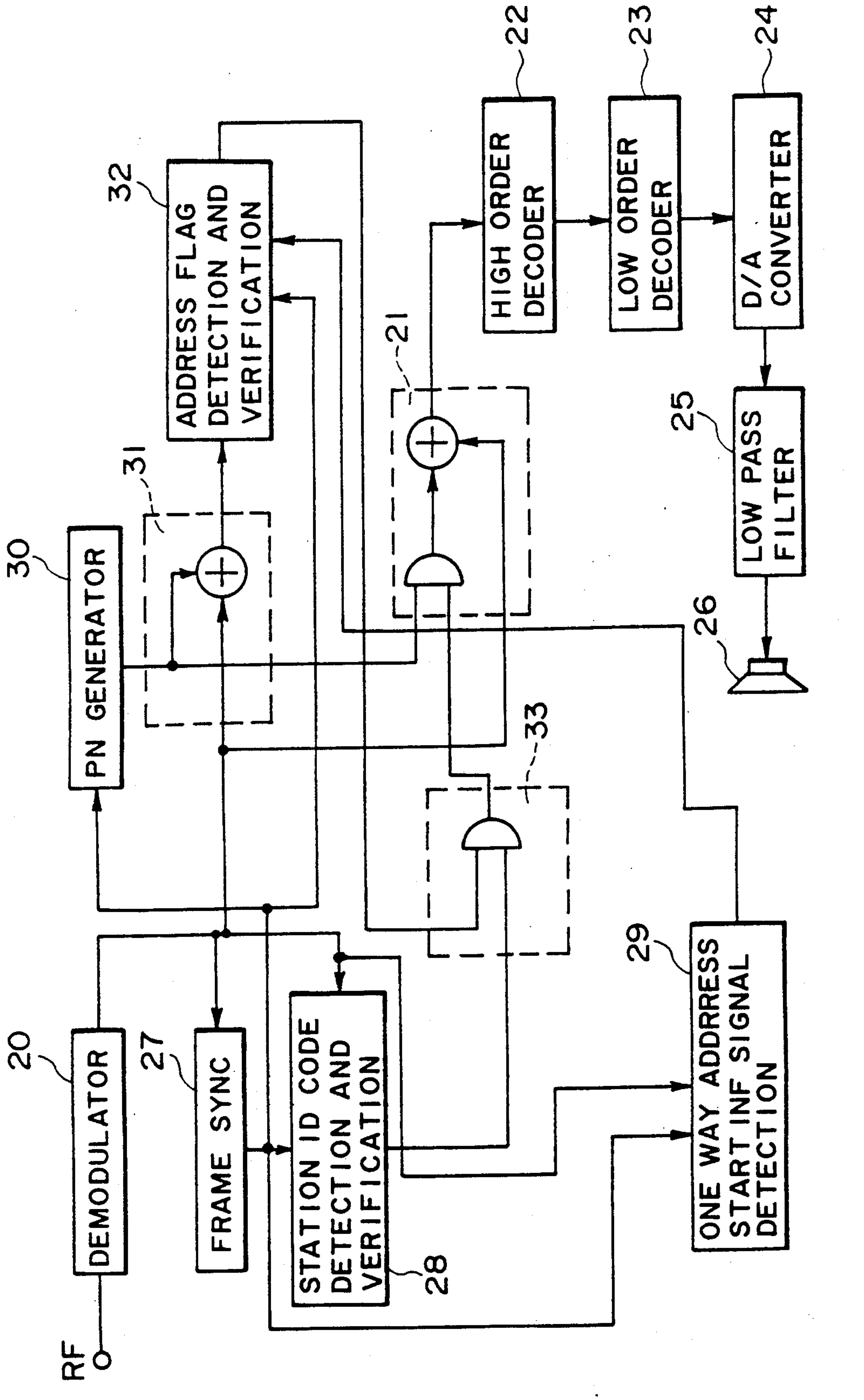

FIG. 5 is a block diagram of the main section in the one way address system receiver.

The RF signal transmitted from a cable (not shown) is demodulated (four-phase DPSK demodulation) by a demodulator 20 and converted into the bit stream signal as the time division multiplexed signal.

In the bit stream signal, only the contracted receivable data in the voice data $B_4$ in the high order frame is descrambled by a data descramble unit 21. The descrambled signal is led to a speaker 26 through a high order decoder 22, a low order decoder 23, a D/A converter 24, and a low pass filter 25, so that the voice signal is reproduced.

To descramble the bit stream signal by the descramble unit 21, the bit stream signal is input to a frame sync circuit 27 and the frame synchronizing operation is executed. The decoding operation of the receiver is executed on the basis of the frame sync signal obtained by the frame synchronizing operation. The frame sync signal is input to a STATION ID CODE detection and verification circuit 28. A STATION ID CODE is detected from the bit stream signal which is input to the STATION ID CODE detection and verification circuit 28. The verifying operation of the detection signal of the STATION ID CODE and the STATION ID CODE which the receiver has is executed.

As the result of the verification of the STATION ID CODEs, if they do not coincide, a desired signal is not derived from the STATION ID CODE detection and verification circuit 28. Therefore, the descramble operation of data is not executed, so that the data cannot be decoded.

The frame sync signal is further input to a PN generator 30. The PN generator 30 generates a PN (pseudo random) signal which is produced from the same production polynomial as that on the transmission side. The PN signal is input to a descramble unit 31 to detect the address flag.

The address flag detecting descramble unit 31 descrambles only the address flag $B_5$ of the high order frame signal from the bit stream signal and sends to an address flag detection and verification circuit 32.

A ONE WAY ADDRESS START INF signal detection circuit 29 detects the ONE WAY ADDRESS START INF signal from the bit stream signal on the basis of the frame sync signal which is input to this circuit.

An address counter (not shown) is activated on the basis of the detected ONE WAY ADDRESS START INF signal. The address flag detection and verification circuit 32 generates an address flag which is peculiar to the receiver. This address flag and the address flag derived by the address flag detecting descramble unit 31 are detected and verified.

As the result of the verification, if they do not coincide, the descrambling operation of data is not executed and the data cannot be decoded.

The detection signal of the STATION ID CODE detection and verification circuit 28 and detection signal of the address flag detection and verification circuit 32 obtained as mentioned above are input to a STATION ID CODE address flag verification unit 33. Further, an output signal of this circuit and the PN signal as an output of the PN generator 30 are supplied to the data descramble unit 21 and the RF signal which is input to the receiver is descrambled.

In this manner, only when the STATION ID CODE and address flag which are transmitted from the broadcasting station coincide with the STATION ID CODE and address flag which are generated on the receiver side, data is descrambled and the voice signal can be decoded.

In the one way address transmission system of a PCM music broadcasting according to the invention, the transmission side sends individual address information so as to enable only the contracted receiver to receive and sends identifying means for identifying this information. Therefore, an amount of information to execute the one way address control can be reduced. Therefore, each receiver can identify the contract information content in a short time.

Further, since the broadcasting station sends its own ID code, the broadcasting of the uncontracted broadcasting station cannot be received by the same receiver.

What is claimed is:

1. A one-way address transmission system of PCM music broadcasting comprising:

a broadcasting station for transmitting a PCM broadcasting signal of a sequence of frames, each frame including station identification data, scrambled music data and scrambled address flag data in PCM; and a receiver comprising:

(a) means for verifying the station identification data in the received broadcasting signal as a station code which represents a reproduction admissible station to the receiver to generate a station verification signal;

(b) means for descrambling the scrambled address flag data in the received broadcasting signal;

(c) means for verifying the descrambled address flag data as an address code which represents reproduction admissible receivers to the station to generate a receiver verification signal; and (d) means in response to both of the station verification signal and the receiver verification signal for descrambling the scrambled music data to reproduce a music.

2. The one-way address transmission system according to claim 1, wherein said address flag data in a predetermined number of successive frames in the broadcasting signal constitutes a full address flag and the frame containing the first position flag data in the full address flag includes an address flag start information data, and said receiver verifies the full address by referring to the detection timing of the address flag start information data.

3. One-way address transmission system of PCM music broadcasting comprising:

a broadcasting system for transmitting a PCM broadcasting signal of a sequence of frames, each frame including a pair of scrambled music data and address flag data; and a receiver for verifying the address flag data in the received broadcasting signal as an address code which represents reproduction admissible receivers to the station and for descrambling the music data to reproduce a music when the verification is made;

wherein said address flag data in a predetermined number of successive frames constitute a full address flag and the frame containing the first position flag data in the full address flag includes an address flag start information data, and said receiver verifies the received flag data by referring to the detection timing of the address flag start information data.

* * * * *